US008954774B2

(12) United States Patent
Murakami et al.

(10) Patent No.: US 8,954,774 B2
(45) Date of Patent: Feb. 10, 2015

(54) PREVENTING STARTING OF THE CURRENT USER OPERATION TO SAVE POWER BASED ON COMBINED MOST RECENT OPERATION TIME

(75) Inventors: Takeo Murakami, Kawasaki (JP); Masahide Noda, Kawasaki (JP); Masatomo Yasaki, Kato (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 13/479,587

(22) Filed: May 24, 2012

(65) Prior Publication Data

US 2013/0007493 A1 Jan. 3, 2013

(30) Foreign Application Priority Data

Jun. 29, 2011 (JP) ................................. 2011-144787

(51) Int. Cl.
*G06F 1/00* (2006.01)
*G06F 1/32* (2006.01)
(52) U.S. Cl.
CPC ..................................... *G06F 1/324* (2013.01)
USPC .......................................... 713/322; 713/300
(58) Field of Classification Search
USPC .................................................. 713/322, 300
See application file for complete search history.

(56) References Cited

U.S. PATENT DOCUMENTS

| 5,428,790 | A  | * | 6/1995  | Harper et al. .................. 713/322 |
| 6,230,279 | B1 | * | 5/2001  | Dewa et al. .................... 713/324 |
| 6,535,985 | B1 |   | 3/2003  | Oshima et al. |
| 6,643,792 | B1 | * | 11/2003 | Kurosawa ...................... 713/501 |
| 7,168,088 | B1 | * | 1/2007  | Matena ............................. 726/3 |
| 7,577,722 | B1 | * | 8/2009  | Khandekar et al. ........... 709/220 |
| 7,610,499 | B2 | * | 10/2009 | Zdravkovic .................... 713/320 |
| 8,127,168 | B2 | * | 2/2012  | Maeda et al. .................. 713/330 |
| 8,166,322 | B2 | * | 4/2012  | Kawashima et al. .......... 713/322 |
| 8,533,785 | B2 | * | 9/2013  | Ohno et al. ....................... 726/4 |
| 8,595,746 | B2 | * | 11/2013 | Shidai et al. .................. 718/107 |
| 8,601,105 | B2 | * | 12/2013 | Goto et al. ..................... 709/223 |
| 2004/0193935 | A1 | * | 9/2004 | Kato et al. ..................... 713/500 |
| 2005/0081122 | A1 |   | 4/2005 | Hiramatsu et al. |
| 2005/0198633 | A1 | * | 9/2005 | Lantz et al. ....................... 718/1 |
| 2007/0150893 | A1 | * | 6/2007 | Grobman .......................... 718/1 |
| 2008/0123494 | A1 | * | 5/2008 | Ashida et al. ............... 369/53.18 |
| 2008/0301554 | A1 | * | 12/2008 | Ishidera et al. ............... 715/700 |
| 2009/0007109 | A1 | * | 1/2009 | Kang ................................ 718/1 |
| 2009/0113426 | A1 | * | 4/2009 | Mizuno .............................. 718/1 |

(Continued)

FOREIGN PATENT DOCUMENTS

| JP | 4-76639 | 3/1992 |
| JP | 2000-148315 | 5/2000 |
| JP | 2005-115751 | 4/2005 |

*Primary Examiner* — Thomas Lee
*Assistant Examiner* — Santosh R Poudel
(74) *Attorney, Agent, or Firm* — Staas & Halsey LLP (57) ABSTRACT

A computer system for managing a plurality of virtual machines, the computer system including: a processor; and a memory coupled to the processor, wherein the processor executes a process includes: recording, on the memory, an operation history of a virtual machine that is related to a user operation in the plurality of virtual machines; determining whether the user operation is performed or not at switching of the virtual machines by referring to the operation history and comparing an operation time of the virtual machine that has operated most recently with the operation time of a control table, the control table being stored in the memory; and increasing an operation frequency of a CPU when performance of the user operation is detected.

11 Claims, 9 Drawing Sheets

(56) References Cited

U.S. PATENT DOCUMENTS

| | | |
|---|---|---|
| 2009/0204830 A1* | 8/2009 | Frid et al. .................. 713/322 |
| 2010/0070980 A1* | 3/2010 | Tanaka et al. ............... 719/318 |
| 2010/0192214 A1* | 7/2010 | Ohno et al. .................... 726/8 |
| 2010/0214949 A1* | 8/2010 | Smith et al. ................. 370/254 |
| 2010/0333100 A1* | 12/2010 | Miyazaki et al. ........... 718/103 |
| 2011/0106993 A1* | 5/2011 | Arinobu et al. ............. 710/262 |
| 2011/0126139 A1* | 5/2011 | Jeong et al. ................. 715/767 |
| 2011/0138197 A1* | 6/2011 | Lakshmanan et al. ...... 713/300 |
| 2011/0154321 A1* | 6/2011 | Tian et al. ...................... 718/1 |
| 2011/0225591 A1* | 9/2011 | Wada et al. ................. 718/103 |
| 2011/0296000 A1* | 12/2011 | Ferris et al. ................. 709/224 |
| 2012/0030346 A1* | 2/2012 | Fukuda et al. .............. 709/224 |

* cited by examiner

| VM ID | USER OPERATION DETECTION TIME (SET VALUE) | MOST RECENT OPERATION TIME |
|---|---|---|
| A (GUEST VM) | 9 ms | 4 ms |
| B (DRIVER VM) | 9 ms | 4 ms |
| C (DRIVER VM) | 12 ms | 0 ms |
| A+B | 10 ms | 10.5 ms |
| A+C | 14 ms | 0 ms |
| A+B+C | 15 ms | 10.5 ms |

PREVENTING STARTING OF THE CURRENT USER OPERATION TO SAVE POWER BASED ON COMBINED MOST RECENT OPERATION TIME

CROSS-REFERENCE TO RELATED APPLICATION

This application is based upon and claims the benefit of priority of the prior Japanese Patent Application No. 2011-144787, filed on Jun. 29, 2011, the entire contents of which are incorporated herein by reference.

FIELD

The embodiments discussed herein are related to a computer system, a method for controlling power of a computer system, and a recording medium for power control program.

BACKGROUND

With enhancement of the CPU performance, it has become possible to implement a virtualization technique to singly operate a plurality of operating systems (OS) in incorporated equipment or terminal in which the CPU is incorporated. In a terminal such as a portable telephone, such a system is introduced that a plurality of OSs are mounted on one device and an operation OS is changed by changing a screen. Thus, performance demanded for one terminal has been increasing. Therefore, such control has been demanded that the terminal is effectively operated with limited power while securing user operation performance of the terminal. To this demand, a plurality of operation frequencies and operation voltages of the CPU mounted on the incorporated equipment can be switched, and thus an operation speed and power consumption can be controlled.

As such related art technique, there is such technique that a first OS records an operation history and an analysis record application which is a second OS analyzes the operation history of the first OS so as to detect a sign of failure before an occurrence of failure, preliminarily execute processing of dealing with failure, and thus suppress an influence of failure. Further, there is such technique that an information gathering routine is started with event execution start of a designated task as a trigger and a processing result of the event execution and the like are recorded so as to reduce an effect to online performance and enable after offline analysis. Further, there is such technique that after a first block detects an input from a key board or the like and a second block having a memory effect is started to change a display, power supply to the first and second blocks is stopped so as to reduce power consumption.

However, in the related art techniques described above, it has been difficult to execute control satisfying both power control of a CPU of a virtualized computer system and control of processing speed. In a virtualization system, a plurality of virtual machines (VM) operate and a virtual machine monitor switches an operation of the virtual machine in response to an operation of a user or the like so as to change assignment of CPU sources to respective VMs and an operation frequency of the CPU. For example, when a user starts an operation of a portable terminal, a guest VM related to the operation and a driver VM are alternately operated in a switching manner. Accordingly, a CPU load of the system increases. However, when such configuration that the CPU load is regularly detected by using a threshold value or the like is employed, a CPU frequency is not increased unless the CPU load exceeds the threshold value. Therefore, even when a user operation is performed, execution time at a low CPU frequency is prolonged until next detection timing at which the CPU frequency is increased, causing delay of processing response with respect to the user operation.

The virtual machine monitor performs processing operated in the background other than the above-described user operation, for example, processing placing less emphasis on a response speed, such as a virus check operated in the service VM, in which power consumption of a terminal is reduced by reducing the CPU frequency depending on the CPU load. Especially, a portable terminal is driven by a battery, so that it is favorable to reduce power consumption. On the other hand, in an operation of the terminal by a user, it is preferable for the virtual machine monitor to quickly detect start of an operation and increase the CPU frequency so as to prioritize the processing speed. In the related art, it has been difficult to satisfy both of power saving of a CPU and enhancement of responsiveness of processing with respect to a user operation.

SUMMARY

According to an aspect of the invention, a computer system for managing a plurality of virtual machines, the computer system including: a processor; and a memory coupled to the processor, wherein the processor executes a process includes: recording, on the memory, an operation history of a virtual machine that is related to a user operation in the plurality of virtual machines; determining whether the user operation is performed or not at switching of the virtual machines by referring to the operation history and comparing an operation time of the virtual machine that has operated most recently with the operation time of a control table, the control table being stored in the memory; and increasing an operation frequency of a CPU when performance of the user operation is detected.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

A preferred embodiment of the present disclosure will be explained in detail with reference to accompanying drawings below. In the embodiment of the present disclosure, a VM operation history analysis unit which records and analyzes CPU operation histories of a plurality of virtual machines (VM) at a virtual machine monitor which administrates a virtualized computer system is provided. The VM operation history analysis unit analyzes an operation of a VM related to a user operation so as to detect whether the user operation is performed. When the VM operation history analysis unit detects that the user operation is performed, the VM operation history analysis unit increases a CPU frequency so as to shorten a response speed with respect to the user operation. When the VM operation history analysis unit does not detect the user operation, the VM operation history analysis unit decreases the CPU frequency depending on a load so as to reduce power consumption. Here, whether the user operation is performed or not is not determined merely based on fluctuation of the CPU load but is determined based on operation time, which is represented in the CPU operation history of the virtual machine, of a virtual machine which has operated most recently, being able to shorten response time with respect to the user operation.

This virtualized computer system is applied to a portable terminal which is driven by a battery such as a portable telephone, for example, and can achieve power saving while enhancing responsiveness of processing with respect to a user operation. However, the computer system is not limitedly applied to the portable terminal.

General Outline of Computer System

Figure 1:
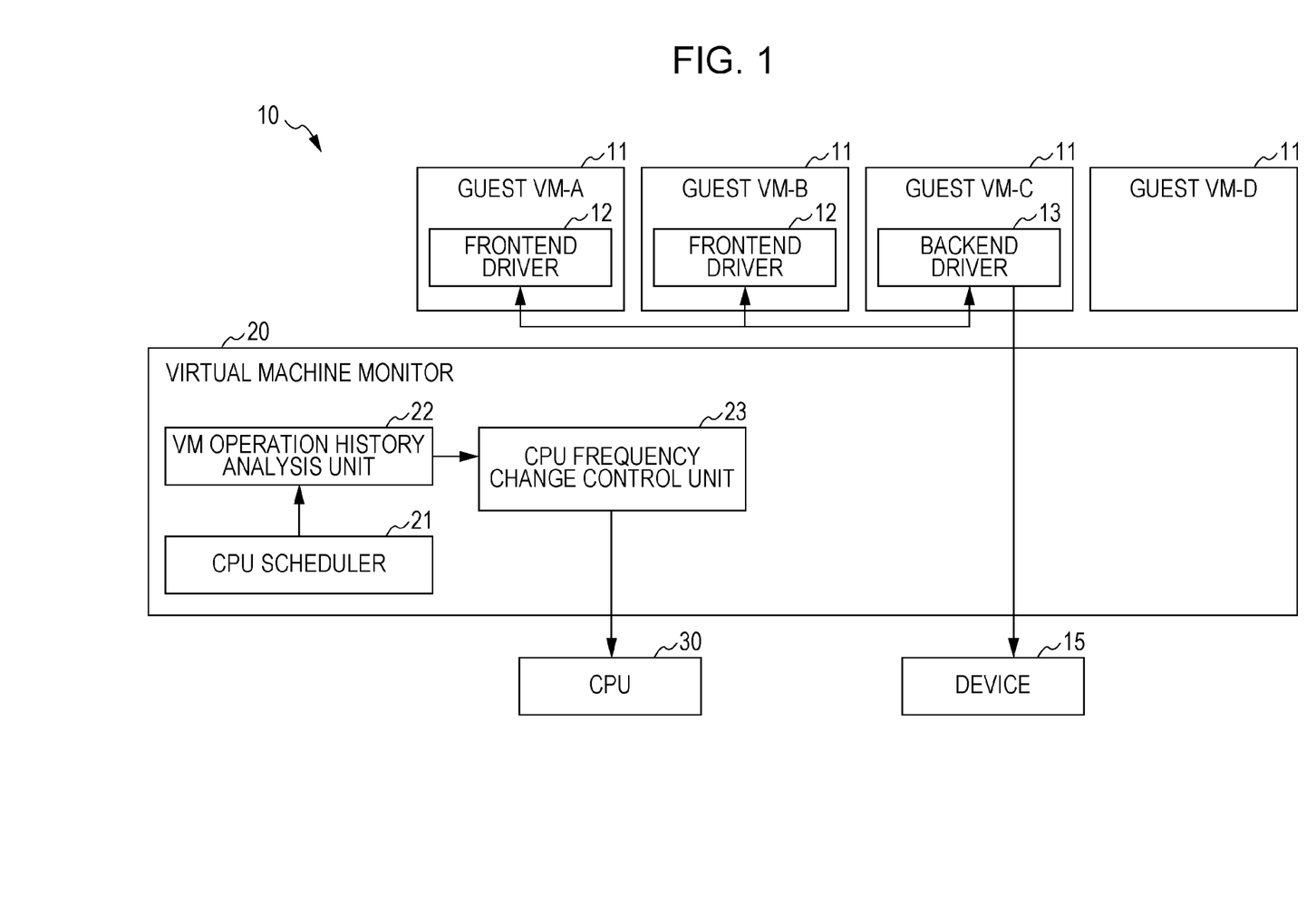
FIG. 1 is a functional block diagram of a computer system according to an embodiment.

FIG. 1 is a functional block diagram of a computer system according to the embodiment of the present disclosure. In a virtualized computer system 10, a plurality of virtual machines (VM) 11 operate. Thus, in the computer system 10 on which a plurality of virtualized OSs are mounted, drivers VM for operating various types of mounted devices are implemented as virtual machines.

Among virtual machines 11 depicted in FIG. 1, a guest VM-A and a guest VM-B are virtual machines (for example, operating systems: OS) for operating applications which are used by a user. A different type of OS is switched and started by an operation of a switching button or the like by the user. A plurality of OSs may be started depending on a usage pattern. Among the virtual machines 11, frontend drivers 12 are respectively implemented in the guest VM-A and the guest VM-B. Further, among the virtual machines 11, a backend driver 13 is implemented in a driver VM-C. The driver VM-C receives a device operation request from the frontend drivers 12 implemented in the guest VM-A and the guest VM-B so as to control various types of devices 15. A plurality of drivers VM-C are commonly started for the respective types of devices 15.

Further, among the virtual machines 11, supplementary service processing used for the system such as a virus check is implemented in a service VM-D. The service VM-D is not directly related to the user operation. The service is executed as background processing of an executed user program, and prompt processing and response are not commonly demanded.

A virtual machine monitor (VMM) 20 performs control for using a single computer system 10 as the plurality of virtual machines 11. This virtual machine monitor 20 includes a CPU scheduler 21, a VM operation history analysis unit 22, and a CPU frequency change control unit 23.

The CPU scheduler 21 controls assignment (scheduling) of a CPU 30 for operating each of the VMs 11. Further, the CPU scheduler 21 calls the VM operation history analysis unit 22 along with switching of the virtual machine 11 which operates.

The VM operation history analysis unit 22 is called when the virtual machines 11 are switched by the CPU scheduler 21, and sequentially records an operation history of an operated virtual machine 11. Whenever the VM operation history analysis unit 22 records the operation history, the VM operation history analysis unit 22 performs analysis processing based on the operation history so as to detect a start of the user operation. Further, depending on an analysis result of the operation history recorded by the CPU scheduler 21, the VM operation history analysis unit 22 calculates a CPU utilization rate of the CPU 30 so as to determine whether to perform changing of the operation frequency of the CPU.

The CPU frequency change control unit 23 performs changing control of the operation frequency of the CPU 30 in accordance with the determination result by the VM operation history analysis unit 22. In particular, the CPU frequency change control unit 23 controls to increase or decrease the operation frequency of the CPU 30.

Figure 2:
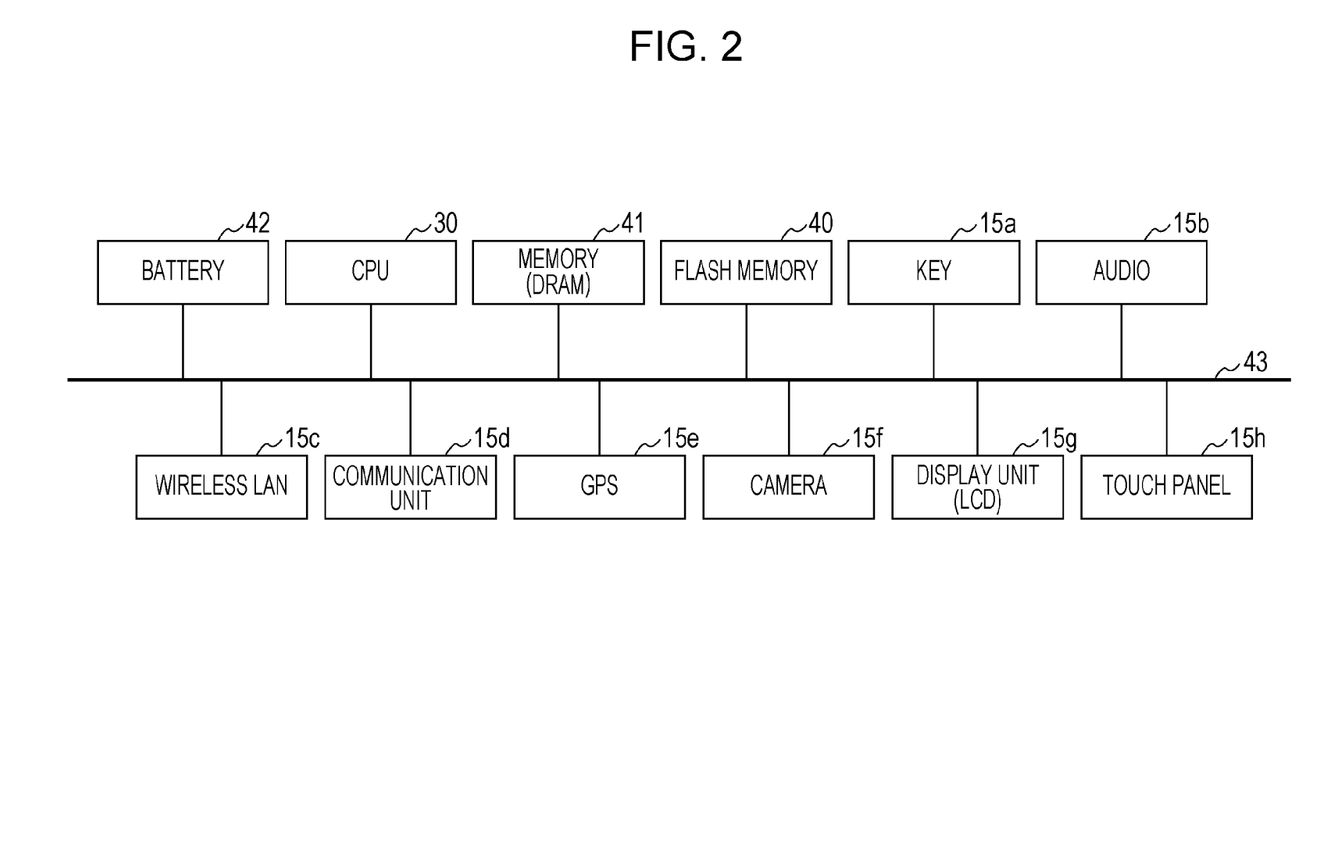
FIG. 2 is a hardware configuration diagram of the computer system according to the embodiment.

FIG. 2 is a hardware configuration diagram of the computer system according to the embodiment of the present disclosure. FIG. 2 illustrates a configuration example of a case where the computer system 10 depicted in FIG. 1 is applied to a portable telephone. The CPU 30 reads an OS and an application stored in a flash memory 40 into a memory 41 and executes the OS and the application. Then, the virtual machines 11 and the virtual machine monitor 20 which are depicted in FIG. 1 can obtain above-described respective functions by program execution in the CPU 30.

This CPU 30 accesses a demanded device 15 when the application is performed. Types of the devices 15 include a key 15a with which a user performs operation input, an audio 15b which outputs sound, a wireless LAN 15c, a communication unit 15d which communicates with a base station of the 3G standard or the like, a GPS 15e which performs positioning of a current position, a camera 15f which performs photographing, a display unit 15g which displays various information, and a touch panel 15h for an operation input of the user. A battery 42 supplies power for operations of respective elements. The above-described respective elements communicate with each other via a bus 43.

For example, when events such as operation input of the key 15a and data reception in the communication unit 15d occur, these key 15a and communication unit 15d notify the CPU 30 of interruption and the CPU 30 performs processing corresponding to the interruption.

Processing Outline of VM Operation History Analysis Unit

The VM operation history analysis unit 22 analyzes an operation of a VM related to the user operation along the following procedure so as to detect whether the user operation is performed. (1) The VM operation history analysis unit 22 preliminarily records user operation detection time for detecting a user operation for each of the virtual machines 11 (the guest VM-A, the guest VM-B, and the driver VM-C) related to the user operation in a control table, and determines that the user operation is detected when VM operation time of the corresponding virtual machine 11 exceeds the user operation detection time. (2) The VM operation history analysis unit 22 preliminarily records user operation detection time of combination of the virtual machines 11 (the guest VM-A, the guest VM-B, and the driver VM-C) related to the user operation in a control table as well, and determines that the user operation is detected when VM operation time of the combination of the corresponding virtual machines 11 exceeds the user operation detection time. (3) When the VM operation history analysis unit 22 determines that the user operation is detected, the VM operation history analysis unit 22 increases the CPU frequency so as to shorten a response speed with respect to the user operation. When the VM operation history analysis unit 22 determines that the user operation is not detected, the VM operation history analysis unit 22 decreases the CPU frequency depending on a load so as to reduce power consumption.

Application Example to Portable Telephone

Figure 3:
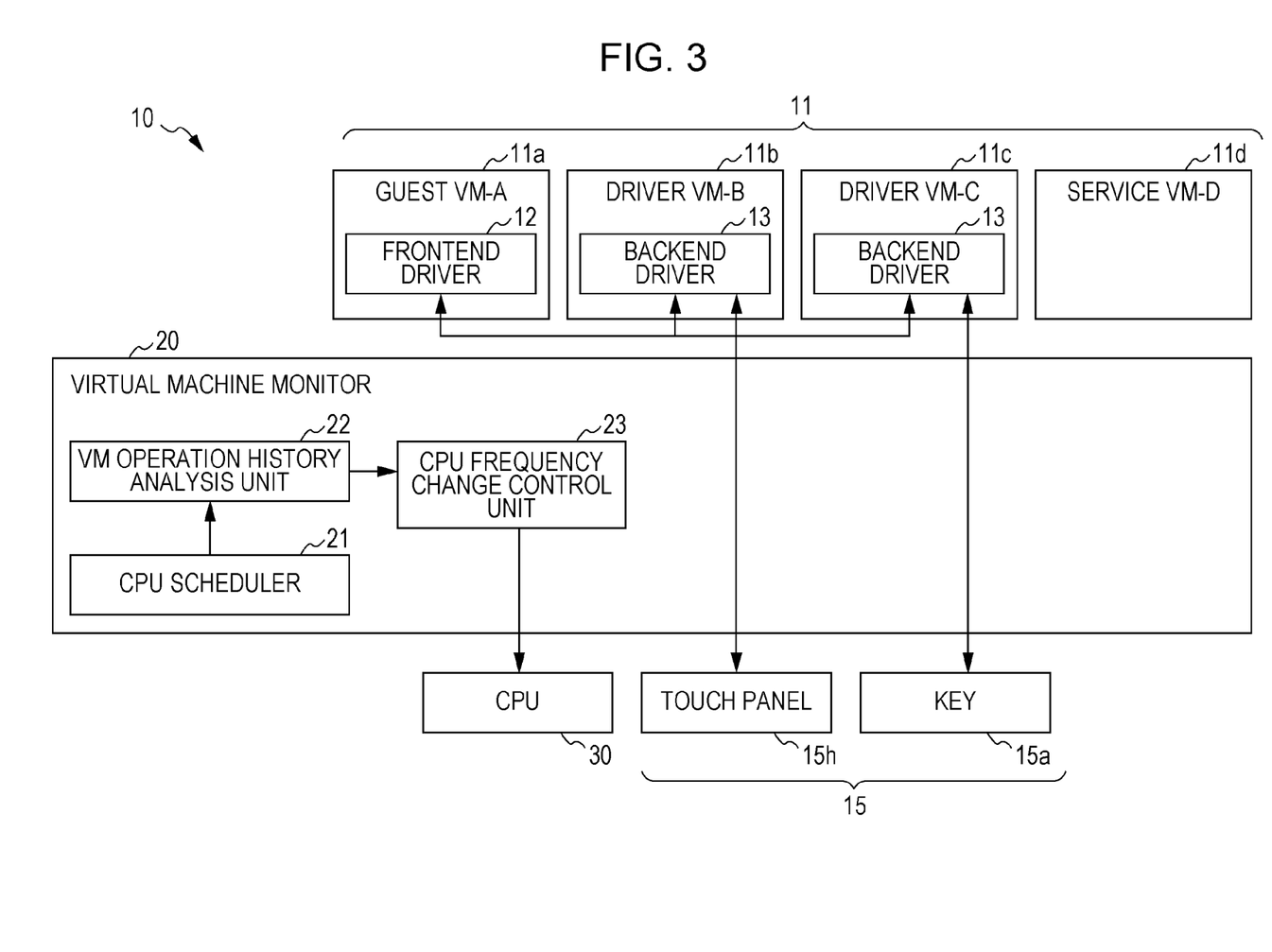
FIG. 3 is a functional block diagram in which the computer system according to the embodiment is applied to a portable telephone.

FIG. 3 is a functional block diagram that the computer system according to the embodiment of the present disclosure is applied to a portable telephone. As an example of the embodiment of the present disclosure, the configuration of a case where a plurality of virtual machines 11 (virtual machine) operate in a virtualized portable telephone system is described. In FIG. 3, elements same as those of FIGS. 1 and 2 are given the same reference characters.

As illustrated in FIG. 3, the virtual machine monitor 20 operates in a portable telephone on which one CPU 30 is mounted. The CPU 30 which is mounted and used here is a CPU of which power consumption can be controlled by dynamically changing an operation frequency and a voltage. As the devices 15, the key 15a and the touch panel 15h are provided. In this portable telephone, the guest VM-A (11a) which is the virtual machine 11 executes a guest OS on a virtualized system. For example, the user performs an operation by following a displayed operation screen by an execution of the guest VM-A (11a). In response to an operation request from the guest VM-A (11a), the driver VM-B (11b) and the driver VM-C (11c) operate as the virtual machines 11 for operating the devices 15 (the key 15a and the touch panel 15h). Further, the virtual machine 11 (the service VM-D (11d)) which performs a virus check from an external network and the like also operates.

Figure 4:
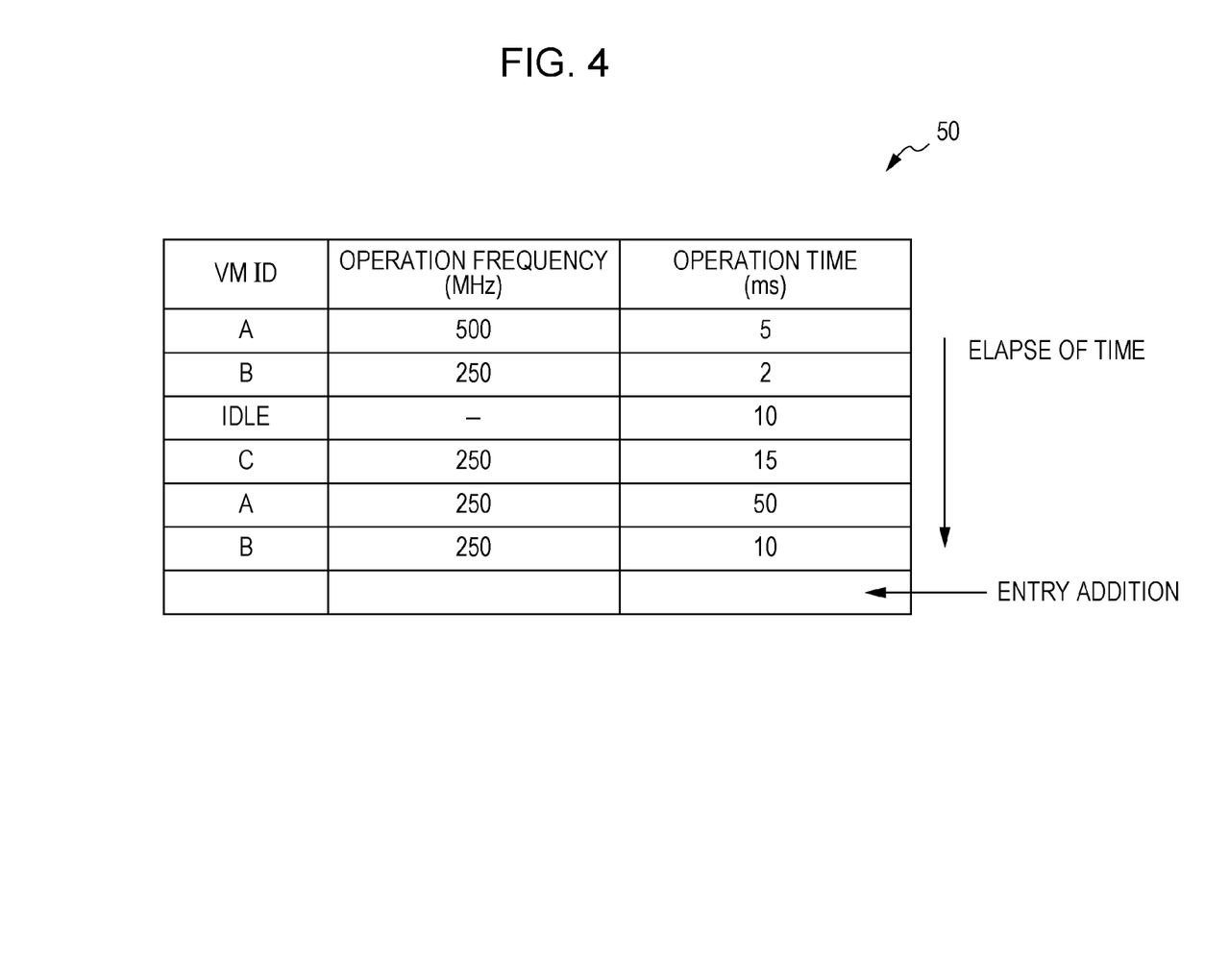
FIG. 4 is a diagram illustrating a VM operation history table which is an operation history of a virtual machine.

FIG. 4 illustrates a VM operation history table which represents an operation history of the virtual machine. FIG. 4 illustrates an example of a VM operation history table 50 which is recorded in the memory 41 or the like by the VM operation history analysis unit 22. The VM operation history table 50 includes items which are an identifier of the virtual machine 11 (VM ID), an operation frequency of the CPU 30 when each virtual machine operates, and operation time of the virtual machine 11, in time series from the top to the bottom of the diagram. The VM operation history analysis unit 22 is called when operating virtual machines 11 are switched by the CPU scheduler 21. Then, the VM operation history analysis unit 22 adds a VM ID, an operation frequency, and operation time as a operation history of the virtual machine 11 which has operated immediately before, in the last line of the VM operation history table 50 as new entry.

Figure 5:
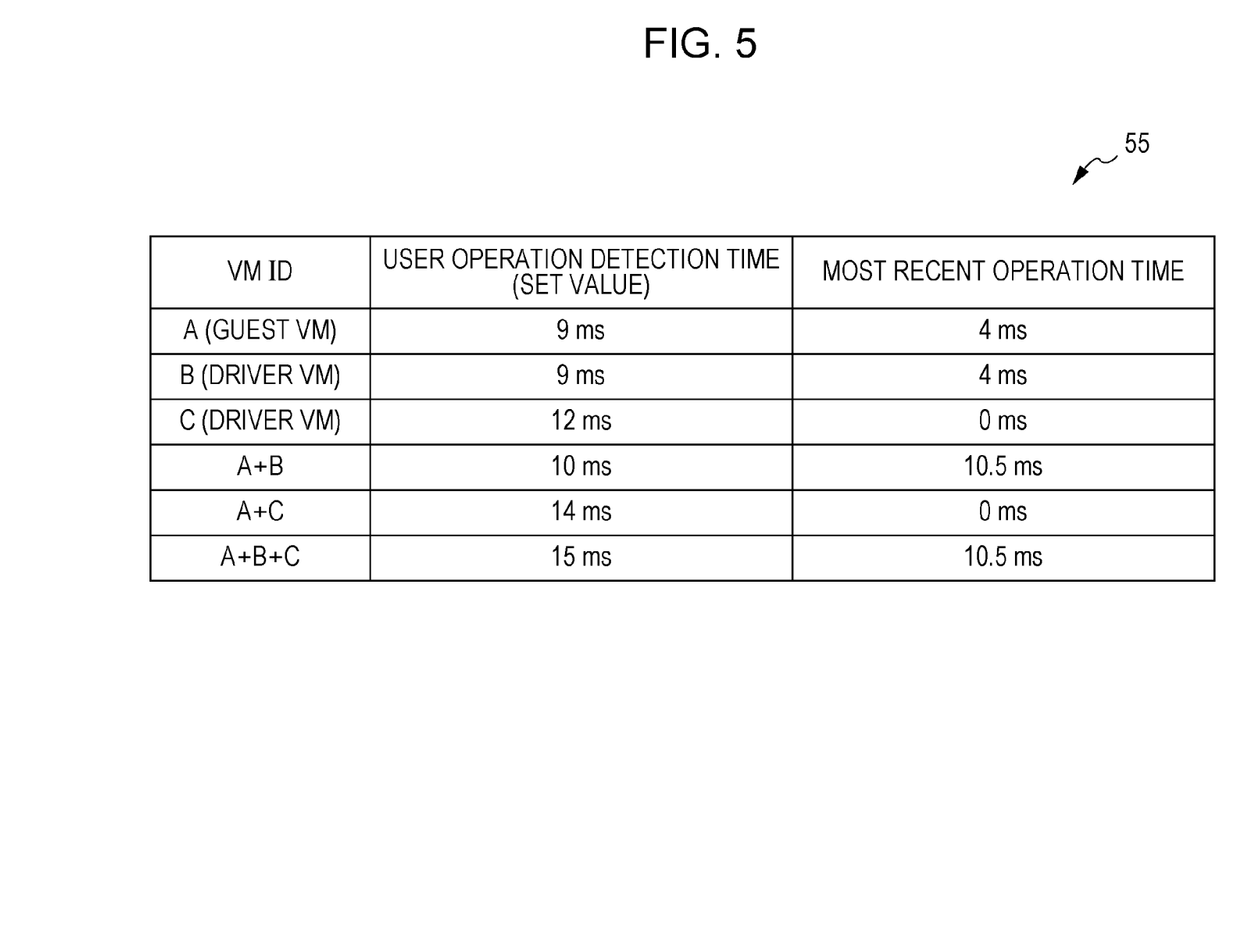
FIG. 5 is a diagram illustrating a user operation detection control table for determining user operation detection.

FIG. 5 illustrates a user operation detection control table for determining user operation detection. This user operation detection control table 55 is stored in the memory 41 or the like by the VM operation history analysis unit 22 and preliminarily retains about the virtual machine 11 related to the user operation. In an example illustrated in FIG. 5, a guest VM-A (11a), a driver VM-B (11b), and a driver VM-C (11c) correspond to the virtual machines 11 related to a user operation. FIG. 5 illustrates an example of entries of respective identifiers (VM ID) of a single and combinations of a plurality of virtual machines 11, which continuously operate, when the guest VM-A (11a) is considered as the base, user operation detection time of respective identifiers, and most recent operation time.

Entries of user operation detection time are preliminarily set in arrangement of a portable telephone, as threshold values for determination of user operation start so as to be fixed values. Most current operation time is time of the virtual machines 11 which continuously operate until immediately before the VM operation history analysis unit 22 is called in switching of the virtual machines 11 and is overwritten and recorded every time the operation of the virtual machines 11 is ended. The VM operation history analysis unit 22 compares most recent operation time of each of the virtual machines 11 to the user operation detection time. When the most recent operation time is larger than the user operation detection time, the VM operation history analysis unit 22 determines that the user operation is started.

An operation frequency of the CPU 30 can be switched to a plurality of frequency stages and the operation frequency differs in each of the virtual machines 11 which operate. Corresponding to this, most recent operation time recorded in entries is uniformly converted into single reference frequency so as to be stored. In the example illustrated in FIG. 5, results of the reference frequency of the CPU 30 being set to 500 MHz are shown. In this case, most recent operation time which is recorded=most recent actual operation time×(operation frequency in most recent actual operation time/reference frequency) is obtained.

For example, when most recent actual operation time of the virtual machine 11, which operates when the operation frequency of the CPU 30 is 500 MHz, is 4 ms, 4 ms is directly recorded as the most recent operation time. When most recent actual operation time of the virtual machine 11, which operates when the operation frequency of the CPU 30 is 250 MHz which is half of the reference frequency, is 4 ms, 2 ms which is obtained by conversion into the reference frequency is recorded as the most recent operation time.

Thus, determination of the operation start by a user is performed based on operation time (most recent operation time) of one or a plurality of virtual machines 11 which most recently continuously operate due to switching of the virtual machines 11. By determining this concept of time, timing of the operation start by a user can be appropriately determined in a manner to correspond to load fluctuation of the CPU 30 and the timing can be promptly detected. In addition, timing of the operation start by a user can be appropriately determined in a manner to correspond to change of the operation frequency of the CPU 30.

Description of Processing of User Operation Detection

Figure 6:
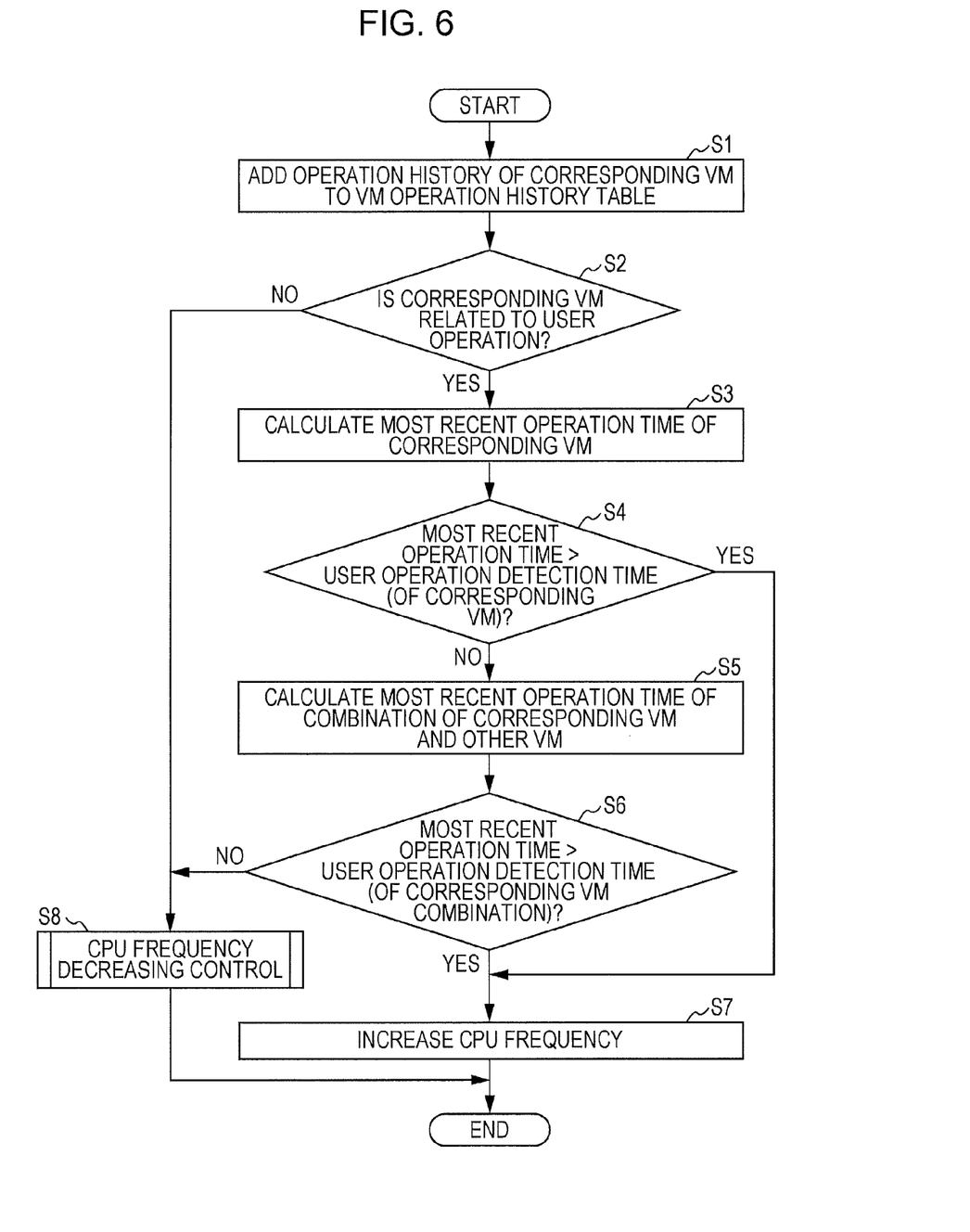
FIG. 6 is a method illustrating a processing content of user operation detection of the computer system according to the embodiment.

FIG. 6 is a method illustrating a processing content of user operation detection of the computer system according to the embodiment. The processing illustrated in FIG. 6 is executed when the VM operation history analysis unit 22 is called by the CPU scheduler 21 every time the virtual machines 11 are switched.

First, the VM operation history analysis unit 22 adds information of an operation history of a virtual machine 11 which has operated until immediately before (a VM ID, a CPU operation frequency, and operation time) to an entry of the VM operation history table 50 (step S1). Then, it is determined whether the virtual machine 11 which has operated until immediately before is a virtual machine (VM) which is related to a user operation (step S2). Concretely, referring to the user operation detection control table 55 of FIG. 5, when a VM ID of the virtual machine 11 is recorded in the user operation detection control table 55, it is determined that the virtual machine 11 is a VM related to the user operation (step S2: Yes), and when the VM ID is not recorded in the user operation detection control table 55, it is determined that the virtual machine 11 is not the VM related to the user operation (step S2: No).

When the virtual machine 11 is not a VM related to the user operation (step S2: No), the CPU frequency decreasing control is performed (step S8) and the processing is ended. When the virtual machine 11 is a VM related to the user operation (step S2: Yes), most recent operation time of this virtual machine 11 is calculated (step S3). This most recent operation time is calculated by referring to the VM operation history table 50 of FIG. 4. Concretely, the most recent operation time is calculated by converting total time of time during which the corresponding virtual machine 11 has continuously operated most recently without interposing idle time into reference frequency. Then, the calculated most recent operation time is recorded in an entry of the user operation detection control table 55.

Next, the most recent operation time calculated in step S3 is compared to user operation detection time having the same VM ID set in the user operation detection control table 55 (step S4). As a result of the comparison, when the most recent operation time exceeds the user operation detection time (step S4: Yes), it is determined that the user operation is started and the CPU frequency is increased (step S7) so as to end the processing. The VM operation history analysis unit 22 instructs the CPU frequency change control unit 23 to control and increase the CPU frequency and the CPU frequency change control unit 23 increases the frequency of the CPU 30. In this embodiment, the CPU frequency change control unit 23 increases the frequency of the CPU 30 up to the maximum intrinsic frequency of the CPU 30 so as to shorten response time when a user operation is performed.

When the most recent operation time does not exceed the user operation detection time (step S4: No), most recent operation time of combination with other virtual machine 11 which is set in the user operation detection control table 55 is calculated (step S5). In the example of FIG. 5, when the corresponding VM ID is A, most recent operation time of each of combinations of VM ID A+B, A+C, and A+B+C is calculated. Then, the most recent operation time calculated in step S5 is compared to the user operation detection time of the corresponding combinations (step S6).

As a result of the comparison, when the most recent operation time exceeds any of the user operation detection time of the corresponding combinations (step S6: Yes), it is determined that the user operation is started and the CPU frequency is increased (step S7) so as to end the processing. On the other hand, when the most recent operation time does not exceed any of the user operation detection time of the corresponding combinations (step S6: No), it is determined that the user operation is not started and the CPU frequency decreasing processing is performed (step S8) so as to end the processing.

On CPU Frequency Lowering Processing

Figure 7:
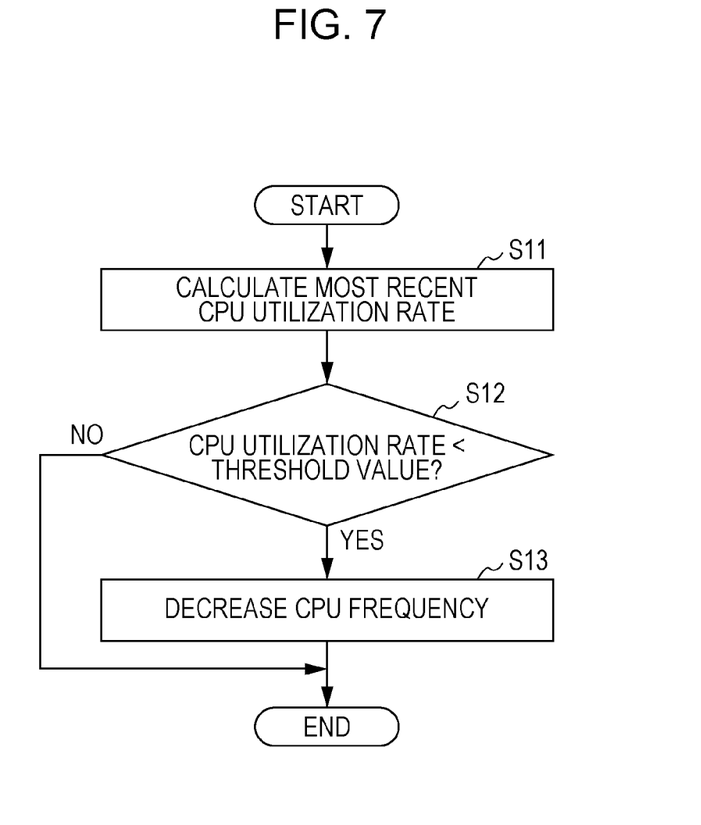
FIG. 7 is a method illustrating a processing content of CPU frequency decreasing processing of the computer system according to the embodiment.

FIG. 7 is a method illustrating a processing content of the CPU frequency decreasing control of the computer system according to the embodiment. The processing content illustrated in step S8 of FIG. 6 is described. This processing is executed when the virtual machine 11 which has operated most recently is determined as a virtual machine which is not related to the user operation start.

First, the VM operation history analysis unit 22 calculates a CPU utilization rate of the most recent system (when the virtual machine 11 operates) based on the VM operation history table 50 illustrated in FIG. 4 (step S11). Then, the VM operation history analysis unit 22 determines whether the most recent CPU utilization rate is lower than a threshold value which is preliminarily set (step S12). When the most recent CPU utilization rate is lower than the threshold value which is preliminarily set (step S12: Yes), the frequency of the CPU 30 is decreased (step S13) so as to reduce power consumption and end the processing. When the most recent CPU utilization rate is not lower than the threshold value which is preliminarily set (step S12: No), the processing is ended.

Here, when only one threshold value is set, the frequency of the CPU 30 is decreased to be an operation frequency which is one stage lower than the frequency which is preliminarily set. In this case, the operation frequency of the CPU is gradually decreased in every execution of plural times of the decreasing processing illustrated in FIG. 7. Further, plural stages of threshold values can be set for different CPU utilization rates. In this case, the frequency of the CPU 30 can be directly decreased to a frequency corresponding to each of the stages of the threshold values.

Practical Example

Figure 8:
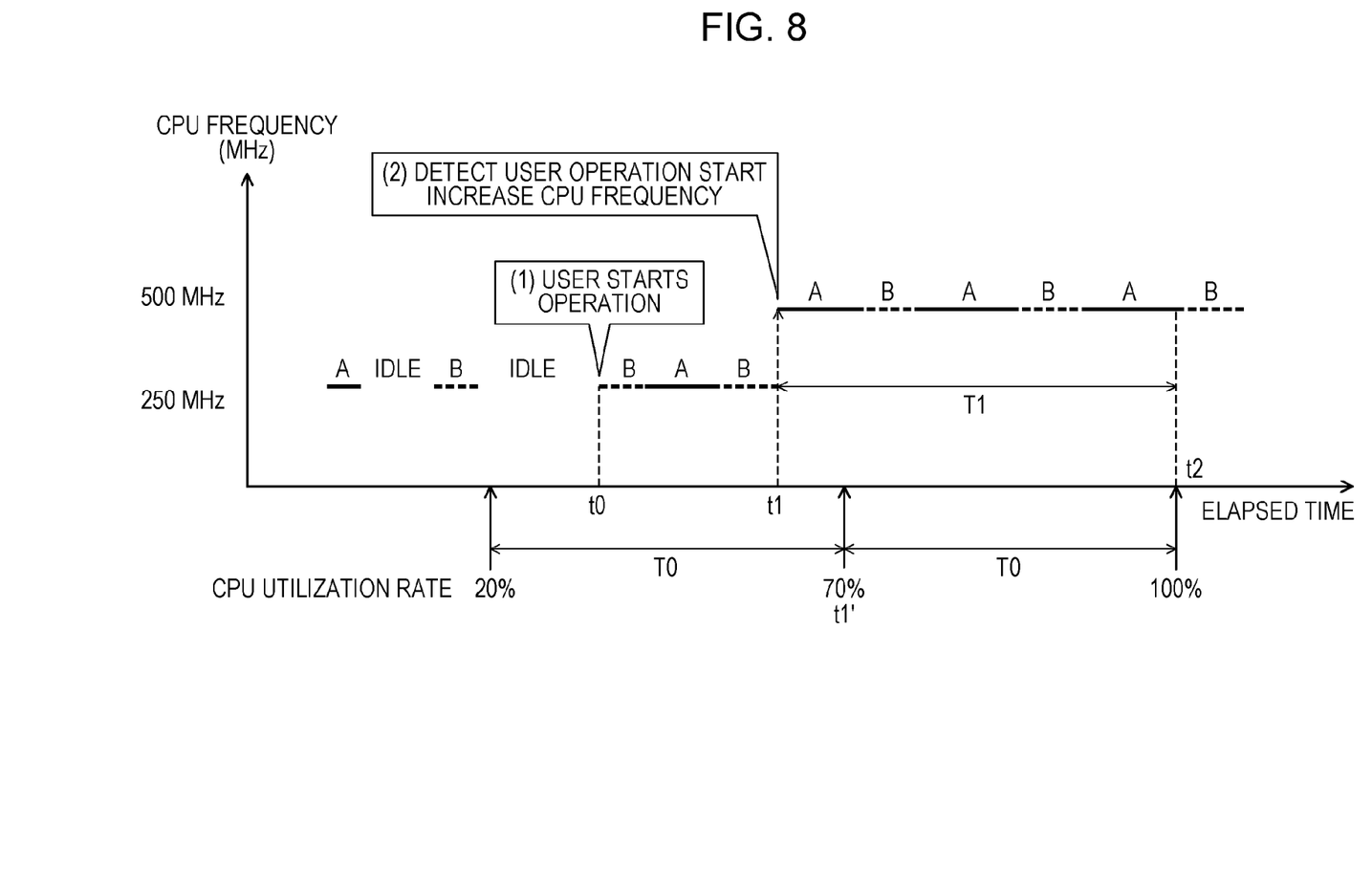
FIG. 8 is a timing diagram illustrating an operation of a virtual machine and fluctuation of a CPU frequency in time series.
Figure 9:
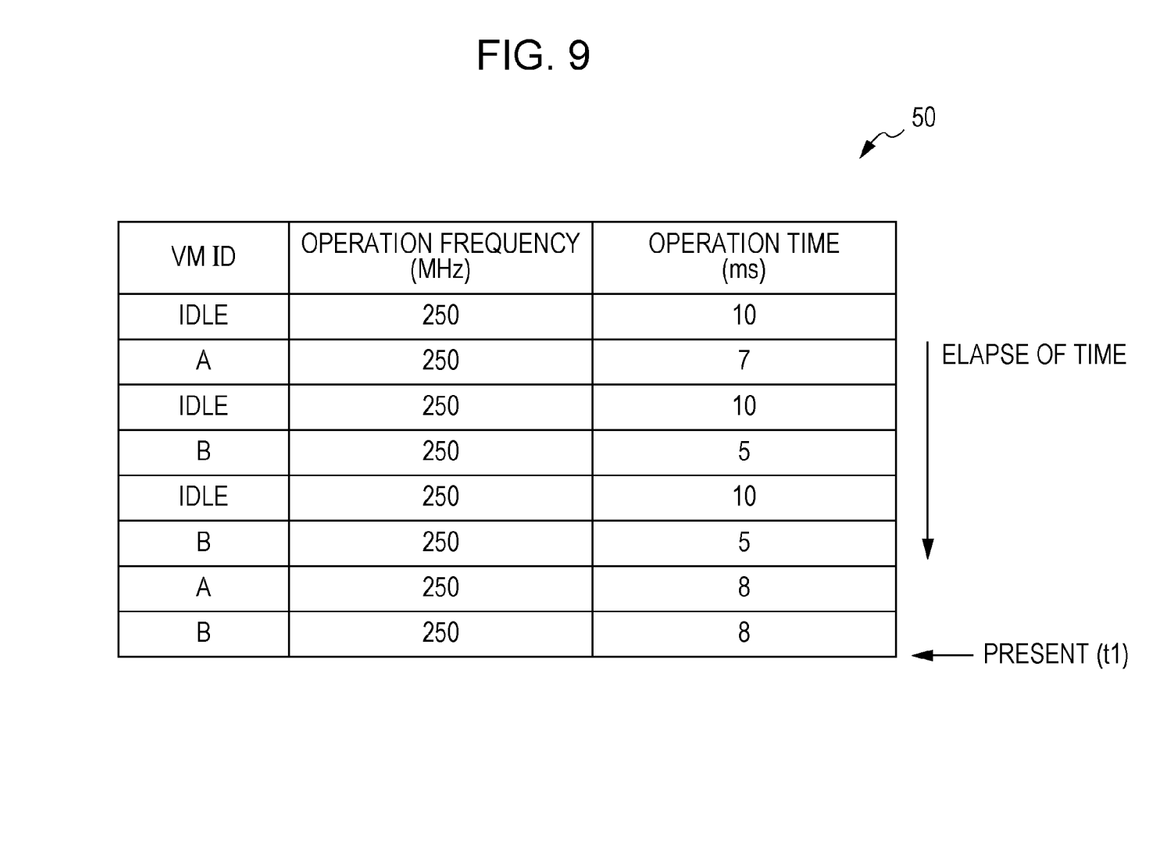
FIG. 9 is a VM operation history table which is formed in a manner to correspond to the operation of FIG. 8.

Hereinafter, an example of an operation of a virtual machine having the above-described configuration and fluctuation of a CPU frequency is described. FIG. 8 is a timing diagram which illustrates an operation of a virtual machine and fluctuation of a CPU frequency in time series. FIG. 9 is a VM operation history table which is made in a manner to correspond to the operation of FIG. 8. A VM operation history table 50 of FIG. 9 represents a VM operation history on time t1 of FIG. 8. In an example illustrated in FIG. 8, such state is illustrated that a load of the system is first low, a virtual machine operates at a low CPU frequency (250 MHz), a user starts an operation of a terminal at time t0, then virtual machines 11 (VM-A, VM-B) which are related to the operation alternately operate, and the CPU load of the system rises.

At time t1, the CPU scheduler 21 switches schedules of the virtual machines 11 from the VM-B (11b) to the VM-A (11a) and calls the VM operation history analysis unit 22. The VM operation history analysis unit 22 calculates most recent operation time in which the VM-B (11b) that is the virtual machine 11, which has operated most recently, continuously operates. In this case, from the VM operation history table 50 of FIG. 9, the virtual machine 11 which continuously operates most recently is the virtual machine 11 after idle time, being detected as the single VM-B (11b) and a combination (A+B) of the VM-B (11b) and the VM-A (11a).

Accordingly, the VM operation history analysis unit 22 calculates most recent operation time of the B which is the single virtual machine 11 and the combination of the virtual machines (A+B) and compares the most recent operation time with detection time which is recorded in the user operation detection control table 55 of FIG. 5.

In terms of the most recent operation time of the virtual machine VM-B, from the user operation detection control table 55 of FIG. 5, continuous operation time after idle time is (5+8)/2=6.5 ms (operation time is divided by 2 because of 500 MHz conversion), thus being lower than 9 ms which is user operation detection time set in corresponding VM ID=B of the user operation detection control table 55. Increasing control of the frequency of the CPU 30 is not performed only by this processing.

However, when most recent operation time of the virtual machines VM (A+B) is calculated in a similar manner, the virtual machines 11 which operate after idle time are B, A, B, so that (5+8+8)/2=10.5 ms is obtained, exceeding 10 ms which is the user operation detection time set in corresponding VM ID=(A+B) in the user operation detection control table 55. Accordingly, the VM operation history analysis unit 22 can detect that the user operation is started at time t1, and promptly increase the frequency of the CPU 30 (500 MHz) at time t1.

Here, related art technique in which control is performed based on a CPU load factor at regular interval T0 is described for comparison. Time t1 on which a user starts an operation is not detection time of the regular interval T0 yet, so that control of the frequency of the CPU 30 is not performed. After this, the CPU utilization rate in an interval up to next time t1' is 70%. Thus, the CPU utilization rate does not exceed a threshold value (95%, for example), and therefore increasing control of the frequency of the CPU 30 is not performed yet. Then, when the CPU utilization rate in an interval up to next time t2 is obtained as 100%, it is first determined that the CPU utilization rate exceeds the threshold value, and increasing control of the frequency of the CPU 30 is performed. Thus, in the related art, even if a user starts an operation and a load starts to rise, it is determined that the frequency of the CPU 30 is not have to be increased unless the CPU utilization rate in the interval of the regular interval T0 reaches the threshold value, delaying timing to increase the frequency of the CPU 30. Accordingly, in the above-described embodiment, the frequency of the CPU 30 can be increased time T1 minutes earlier than the related art, being able to shorten execution processing time of the user operation.

According to the above-described embodiment, in the virtualized computer system in which a plurality of virtual machines operate, a user operation is determined based on operation time of the virtual machines, so that response time with respect to the user operation can be shorten while performing power reduction control of the CPU. Here, if such control that the frequency of the CPU is immediately increased merely by the user operation irrespective of operation time of the virtual machines is employed, the frequency of the CPU is frequently increased even if an actual CPU load is low. However, as the disclosed technique, the frequency of the CPU is increased based on continuous operation time of a virtual machine which is related to the user operation among virtual machines which have most recently operated, enabling a swift response to an actual load of the CPU when the user operation is performed.

It is effective that the present disclosed technology is applied especially to portable devices which operate by a battery such as a virtualized portable telephone. In portable devices, power which can be supplied by battery is limited and therefore power saving control of the CPU is desired and at the same time, it is desirable that the system promptly responds when a user operates a screen of a portable device so as to secure comfortable operation speed. According to the present disclosed technology, start of an execution of the user operation is detected from an operation history of each virtual machine in the virtualized portable telephone and the CPU frequency is promptly increased when an operation speed is desirably kept, being able to secure responsiveness of the system.

Here, the power controlling method described in the embodiment can be realized by executing a predetermined program by a computer constituting a computer system, such as a personal computer. This program is recorded in a recording medium, which can be read by a computer, such as a hard disk, a flexible disk, a CD-ROM, an MO, and a DVD and is read from the recording medium by the computer so as to be executed. This program may be a transmission medium which can be distributed via a network such as Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer system to manage a plurality of virtual machines, the computer system comprising:
   a processor; and
   a memory coupled to the processor, wherein the processor executes a process including:
      recording, on the memory, an operation history of a virtual machine that is related to a user operation in the plurality of virtual machines;
      determining whether a virtual machine that has operated until immediately before a current user operation is requested is a virtual machine that is related to the current user operation;
      when the current user operation is not related to the virtual machine that has operated until immediately before the current user operation is requested, decreasing an operation frequency of the processor;
      when the current user operation is related to the virtual machine that has operated until immediately before the current user operation is requested, calculating a most recent operation time of the virtual machine by referring to the operation history recorded in the memory and comparing the most recent operation time with an operation time for the virtual machine stored in a control table in the memory;
      when the most recent operation time exceeds the stored operation time, increasing the operation frequency of the processor and starting the current user operation;
      when the most recent operation time does not exceed the stored operation time, comparing the most recent operation time with operation times for each combination of the virtual machine with each of the other virtual machines stored in the control table;
      when the most recent operation time exceeds any of the combined operation times, increasing the operation frequency of the processor and starting the current user operation; and
      when the most recent operation time does not exceed any of the combined operation times, decreasing the operation frequency of the processor and preventing the current user operation from starting.

2. The computer system according to claim 1, wherein the processor determines whether the user operation is performed based on a total operation time of the plurality of virtual machines, and increases the operation frequency of the processor when the performance of the user operation is detected.

3. The computer system according to claim 1, wherein when the user operation is not detected, the processor decreases the operation frequency of the processor.

4. The computer system according to claim 1, wherein the processor determines the virtual machine that has been continuously operated after idle time as the virtual machine that has operated most recently.

5. The computer system according to claim 1, wherein the processor records an identifier, an operation frequency, and an operation time of the virtual machine that has been operated, on the memory in chronological order related to the user operation as the operation history of the virtual machine that is related to the user operation.

6. The computer system according to claim 5, wherein when the operation time, recorded on the memory, of the virtual machine that has operated most recently exceeds an user operation detection time for detecting the user operation, the processor determines that the user operation is performed, the user operation detection time being recorded in the control table for each of the virtual machines that are related to the user operation.

7. The computer system according to claim 6, wherein the processor converts the operation time, recorded on the memory, of the virtual machine that has operated most recently into the operation time that is obtained when the operation frequency of the virtual machine that has operated is converted into a pre-defined reference frequency.

8. The computer system according to claim 1, wherein in case of increasing the operation frequency of the processor, the processor controls the operation frequency of the processor to be a maximum intrinsic operation frequency of the processor.

9. The computer system according to claim 1, wherein in case of decreasing the operation frequency of the processor, the processor controls the operation frequency of the processor to decrease based on a utilization rate.

10. A method of controlling power of a computer system executed by a processor to control a plurality of virtual machines operating in the computer system, the method comprising:
   recording, on the memory, an operation history of a virtual machine that is related to a user operation in the plurality of virtual machines;
   determining whether a virtual machine that has operated until immediately before a current user operation is requested is a virtual machine that is related to the current user operation;
   when the current user operation is not related to the virtual machine that has operated until immediately before the current user operation is requested, decreasing an operation frequency of the processor;
   when the current user operation is related to the virtual machine that has operated until immediately before the current user operation is requested, calculating a most recent operation time of the virtual machine by referring to the operation history recorded in the memory and comparing the most recent operation time with an operation time for the virtual machine stored in a control table in the memory;
   when the most recent operation time exceeds the stored operation time, increasing the operation frequency of the processor and starting the current user operation;
   when the most recent operation time does not exceed the stored operation time, comparing the most recent operation time with operation times for each combination of the virtual machine with each of the other virtual machines stored in the control table;
   when the most recent operation time exceeds any of the combined operation times, increasing the operation frequency of the processor and starting the current user operation; and
   when the most recent operation time does not exceed any of the combined operation times, decreasing the operation frequency of the processor and preventing the current user operation from starting.

11. A non-transitory computer-readable recording medium having stored therein a program causing a computer to execute a process to control power of a computer system, the process comprising:
   recording, on the memory, an operation history of a virtual machine that is related to a user operation in the plurality of virtual machines;
   determining whether a virtual machine that has operated until immediately before a current user operation is requested is a virtual machine that is related to the current user operation;
   when the current user operation is not related to the virtual machine that has operated until immediately before the current user operation is requested, decreasing an operation frequency of the processor;
   when the current user operation is related to the virtual machine that has operated until immediately before the current user operation is requested, calculating a most recent operation time of the virtual machine by referring to the operation history recorded in the memory and comparing the most recent operation time with an operation time for the virtual machine stored in a control table in the memory;
   when the most recent operation time exceeds the stored operation time, increasing the operation frequency of the processor and starting the current user operation;
   when the most recent operation time does not exceed the stored operation time, comparing the most recent operation time with operation times for each combination of the virtual machine with each of the other virtual machines stored in the control table;
   when the most recent operation time exceeds any of the combined operation times, increasing the operation frequency of the processor and starting the current user operation; and
   when the most recent operation time does not exceed any of the combined operation times, decreasing the operation frequency of the processor and preventing the current user operation from starting.

* * * * *